United States Patent
Hill

[15] 3,689,732
[45] Sept. 5, 1972

[54] ELECTRIC ARC WORKING TORCH

[72] Inventor: Clifford Warren Hill, Pleasantville, N.Y.

[73] Assignee: Union Carbide Corporation, New York, N.Y.

[22] Filed: Sept. 9, 1970

[21] Appl. No.: 70,800

[52] U.S. Cl. .....................219/130, 219/74, 219/136
[51] Int. Cl. ..............................................B23k 9/00
[58] Field of Search......................219/130, 74, 136

[56] References Cited

UNITED STATES PATENTS 3,536,888  10/1970  Borneman ............219/136 X
3,283,121  11/1966  Bernard et al.............219/130
3,541,298  11/1970  Carkhuff...................219/130
3,469,070  9/1969   Bernard et al.............219/130

Primary Examiner—J. V. Truhe
Assistant Examiner—Hugh D. Jaeger
Attorney—Paul A. Rose, Harrie M. Humphreys and Dominic J. Terminello

[57] ABSTRACT

A front design for electric arc working torches featuring at least one sleeve of electrically insulating material surrounding the torch body and insulating such body from the nozzle, and a clamp and nozzle arrangement such that upon heating of such member they are brought into tighter contact increasing heat transfer thereacross.

8 Claims, 1 Drawing Figure

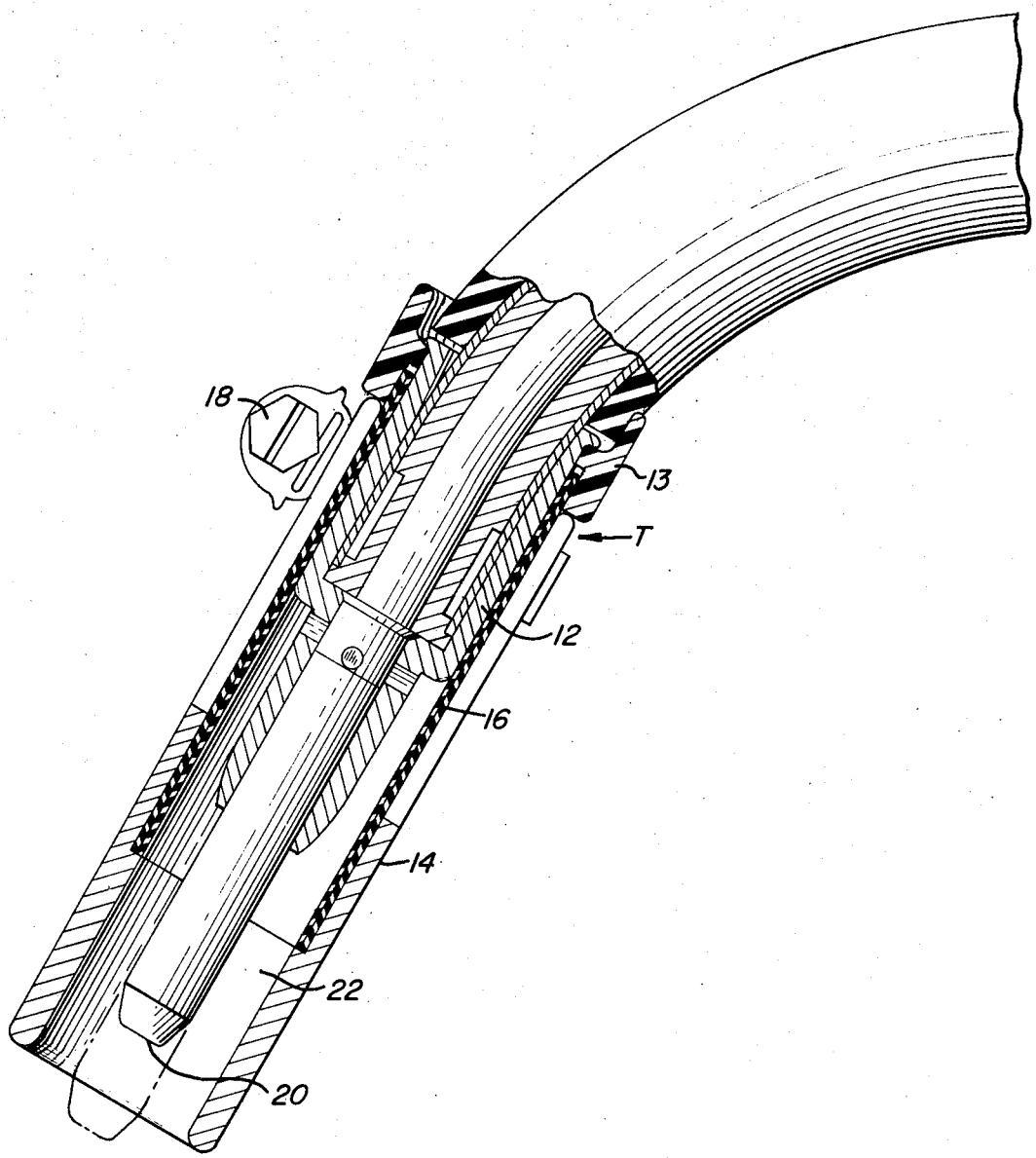

ELECTRIC ARC WORKING TORCH

This invention relates to electric arc working torches and more particularly to such torches which are used in gas shielded arc welding processes such as tungsten inert gas (tig) welding and metal inert gas (mig) welding.

For purposes of simplifying this description, reference will be made to a metal inert gas welding torch. The principles described with reference to such torch are equally applicable to other type torches.

Torch design incorporating conventional means for electrically insulating and cooling the nozzle of such torches has been complex, difficult and expensive to manufacture, heavy and difficult to repair. Recently R. M. Gage in U.S. Pat. application Ser. No. 600,569, now U.S. Pat. No. 3,524,040 discovered a method for designing electric arc working torches using a thin film of high thermal conductive material which satisfactorily conducted heat from the nozzle to the torch body while maintaining electrical insulation therebetween.

This invention is an improvement in the Gage concept and produces a practical application of the principal disclosed by Gage.

Accordingly, it is a main object of this invention to provide a novel front end design for electric arc working torches which is simple, inexpensive to manufacture and easy to repair.

It is a more specific object to provide a welding torch of such design.

These and other objects will become apparent or will be pointed out with reference to the following description and drawings wherein the sole FIGURE is a view partially in cross-section of the preferred embodiment of the invention.

In the drawing, the torch T comprises a water cooled body or heat sink 12. Separating the heat sink 12 from the slotted nozzle 14 is an electrically insulating sleeve 16. The slotted nozzle is preferably made from copper or aluminum alloy and abuts against a nozzle insulator 13. Nozzle insulator 13, in addition to insulating the nozzle, serves as a shock adsorber when a welder strikes the nozzle against a plate to remove adhering spatter from the nozzle, for example. In the embodiment shown, two sleeves are utilized. These sleeves have a wall thickness of preferably about 0.020 inches, although thicker sections up to about one-sixteenth inch may be used, and are made of anodized aluminum, thus providing in effect four electrically insulating surfaces. The anodizing process converts the outside surface of the aluminum sleeves to aluminum oxide, thus forming an insulating coating that is an integral part of the sleeve. This has the advantage that it is less susceptible to chipping than coating which is sprayed on. The preferred anodizing process usually forms a 0.003 ± 0.001 inch thick conversion coating on the aluminum surface.

The nozzle 14 is slotted and is externally clamped by clamping means 18 to the insulating sleeves 16. This arrangement eliminates the nozzle threads which, of course, have a limited life and result in a relatively high thermal resistance due to an accumulation of abrasive spatter in the threads which results in higher nozzle temperatures. A basic objective of the invention is to reduce nozzle temperatures.

Depending from the body 12 is a copper alloy contact tip 20 which is usually concentrically spaced from the interior of the nozzle 14 to provide an annular passage 22 from the flow of gas or gas mixtures out of the torch T.

A consumable wire electrode is fed through the torch T to the contact tip 20 where it picks up welding current fed to the contact tip from a welding power source.

In the embodiment described, the sleeves 16 are approximately 2 inches long and extend into the nozzle 14. Accordingly, a large percentage, approximately 57 percent in the embodiment shown, of the inside diameter of the nozzle which would receive direct radiant heat from the arc and weld puddle is shielded by the sleeves from receiving direct radiant heat from the arc and weld puddle. The percentage would vary with different size nozzles.

Because of the clamp and nozzle arrangement in this invention, thermal expansion results in tightening of the joints and improved heat transfer. The external clamp 18 is made from a material (stainless steel preferably) which has a lower coefficient of thermal expansion than the nozzle material, the anodized aluminum sleeves and the copper alloy body, thus higher temperatures result in a tightening effect when these factors are combined with the slots in the nozzle and anodized sleeves.

Also, because of the slots in the nozzle and the anodized sleeves, in combination with the external clamping means, it is possible to dimension the mating diameters for virtually a perfect fit, which increases heat transfer.

It is preferred to use anodized aluminum sleeves as the insulating sleeves. With the high thermal conductivity of the aluminum oxide anodized coating, the total calculated temperature drop across the four thin film anodized coatings is in the order of only 11°F. when operating at 350 amperes with 95 percent argon and 5 percent oxygen shielding gas. The 11°F. temperature drop across the sleeves indicates that efficient heat transfer is occurring thereacross.

While anodized aluminum is preferred, various other insulation coating materials would be suitable for manufacture of the insulating sleeves. These include beryllium oxide, magnesium oxides, zirconium silicate, borosilicate glass, boron nitride magnesium aluminate and mica, for example. Generally, materials are unsatisfactory if they have a thermal conductivity of less than 0.005 watts/in$^2$/°F./in. from 70°F. to 400°F. which would include materials such as fluorocarbon resins, the most well known being Teflon. However, it is possible to coat the thin anodized aluminum with a very thin coating of Teflon, preferably with less than 0.0005 inch thickness to minimize the possibility of failure of the electrical insulation.

What is claimed is:

1. A gas shielded electric arc working torch comprising an electrically conductive torch body having a heat sink therein;
   at least one sleeve of electrically insulating material surrounding said torch body and in intimate contact therewith, said electrically insulating material having a thermal conductivity of at least 0.005 watts/in$^2$/F./in. from 70°F. to 400°F.;
   a slotted threadless nozzle mounted on said sleeve;

and clamping means securing said nozzle to said sleeve whereby said nozzle and said sleeve can be tightened to ensure intimate contact therebetween.

2. Torch according to claim 1 wherein said sleeve is slotted to ensure intimate contact between said torch body and said sleeve.

3. Torch according to claim 1 wherein said sleeve is approximately two inches long and covers approximately 57 percent of the inside surface of said nozzle that would receive direct radiant heat from the arc and weld puddle.

4. Torch according to claim 1 wherein said sleeve is made of aluminum with an anodized coating.

5. Torch according to claim 1 wherein two sleeves are used.

6. Torch according to claim 5 wherein each sleeve has a wall thickness of approximately $0.020 \pm 0.0015$ and an anodized coating in each surface of each sleeve of approximately $0.003 \pm 0.001$ thick.

7. A torch according to claim 1 wherein a contact tip is connected in said torch body for the passage of a consumable electrode therethrough.

8. A torch according to claim 1 wherein said clamping means have a lower coefficient of thermal expansion than said slotted threadless nozzle.

* * * * *